Patented May 16, 1939

2,158,306

UNITED STATES PATENT OFFICE 2,158,306

DIRECT DYES, PROCESS AND PRODUCT

Swanie S. Rossander, Wilmington, Del., assignor to E. I. du Pont de Nemours & Company, Wilmington, Del., a corporation of Delaware No Drawing. Application June 11, 1937,
Serial No. 147,698

8 Claims. (Cl. 260—175)

This invention relates to direct dyes which are characterized by their substantivity to cellulose. Within the term "cellulose" we include the various compounds recognized as celluloses together with regenerated cellulose.

It is an object of the invention to produce orange dyes which will dye cellulose directly in a water bath. Another object of the invention is to produce the new dyes by means which are economically and technically satisfactory. Another object of the invention is to improve on dyes of the prior art which use amino-naphtholsulfonic acids.

The objects of the invention are accomplished by the products formed by the coupling of N(amino-aroyl) amino-naphthol - sulfonic acids. The objects are also accomplished in some degree by the details of the products and of the methods of producing them which are herein more fully set forth.

The following example is illustrative of the methods of preparing the new compounds:

Example I

Slurry 12.1 parts of 3,3'-diamino-diphenylurea with 400 parts of water. Add 25 parts of 10-normal hydrochloric acid solution. Stir at 20° C. until dissolved. Cool to 5° C. by the addition of ice. Slowly add 50 parts of 2-normal sodium nitrite solution as rapidly as absorbed. Maintain a slight excess of nitrite for 20 minutes at 5–10° C.

Prepare a solution of (4-amino-benzoyl)-2-amino-5-naphthol-7-sulfonic acid by slurrying 39.5 parts with 500 parts of water, and adding ammonia (approx. 9 parts of 27% solution in water) until in solution slightly alkaline to Brilliant yellow paper. Add 1 part of sodium bicarbonate and 16 parts of sodium carbonate. Cool to 10° C.

Slowly add the tetrazo of 3,3'-diamino-diphenyl-urea to the solution of (4-amino-benzoyl)-2-amino-5-naphthol-7-sulfonic acid during 10 minutes with rapid agitation. Stir 2 hours, maintaining strong red alkalinity on Brilliant yellow paper and an excess of (4-aminobenzoyl)-2-amino-naphthol-7-sulfonic acid. Slowly warm to 80° C. Slowly add salt equal to 5% by weight of the volume. Filter. Dry the press-cake in an oven at 80–90° C. The dry powder is reddish-orange in appearance.

Its probable formula is:

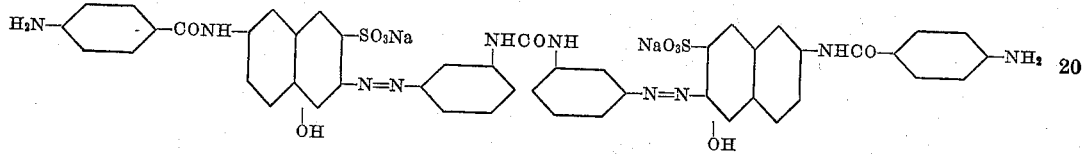

The following examples are further illustrative of the invention and are prepared by means similar to that illustrated in Example I.

| One mol of the tetrazo of— | Coupled to— | Direct shade on cellulose |
|---|---|---|
| 3,3'-diamino-diphenyl-urea | 2 mols of [(para-amino-benzoyl) 2-amino-5-naphthol-7-sulfonic acid]; so called P. A. B.-J-acid | Orange. |
| Do | 2 mols of meta-amino-benzoyl J-acid; so called M. A. B.-J-acid | Do. |
| Do | One mol of P. A. B.-J-acid and one mol of M. A. B.-J-acid | Do. |
| 4,4'-diamino-diphenyl-urea | Two mols of P. A. B.-J-acid | Do. |
| Do | Two mols of M. A. B.-J-acid | Do. |
| Do | One mol of P. A. B.-J-acid and one mol of M. A. B.-J-acid | Do. |
| 3,3'-diamino-diphenyl-urea | Two mols of (para-amino-nenzoyl) para-amino-benzoyl-J-acid | Do. |
| Do | Two mols of meta-amino-benzoyl-meta-amino-benzoyl-J-acid | Do. |

The urea components of these compounds are represented by the formula:

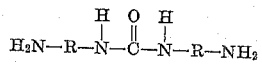

in which R is an aryl nucleus which is preferably benzene, but may be naphthalene. The amino and NH group may be in any position relative to one another. The aryl nucleus may contain other substituent groups; for instance, halogen, alkyl, alkoxy, alphyl, carboxy, and sulfonic acid may be substituted with success. In the preferred embodiment the urea derivative consists of 3,3'-diamino-diphenyl-urea.

Within the term N(amino-aroyl) is included those compounds having a plurality of (amino-aroyl) groups. The amino-aroyl is preferably of the benzene series, but may also be amino-naphthoyl. The amino group of the benzoyl nucleus is preferably meta or para to the benzoyl group, but may be in other positions. The amino-naphthol-sulfonic acid is preferably 2-amino-5-naphthol-7-sulfonic acid, but the various substituents may also fall in other positions. 1-amino-8-naphthol-3,6-disulfonic acid may replace 2-amino-5-naphthol-7-sulfonic acid, or its isomers.

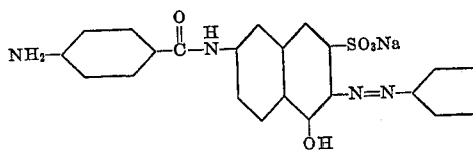

Except that the coupling positions in the naphthalene nucleus must not be blocked, the substituent groups above mentioned may be added to any free position of any of the aryl nuclei.

The products have utility as direct dyes for cellulose and in this respect are superior to dyes of the prior art type involving the use of amino-naphthol-sulfonic acids. Another considerable advantage of the products of this invention consists in that they can be further diazotized on the fiber and coupled to certain coupling components with the production of dyes of different color and of exceptional properties. Those dyes are, however, a separate invention which will be elsewhere described and claimed.

As many apparently widely different embodiments of this invention may be made without departing from the spirit and scope thereof, it is to be understood that I do not limit myself to the specific embodiments thereof except as defined in the appended claims.

I claim:

1. A compound represented in the form of its sodium salt by the formula:

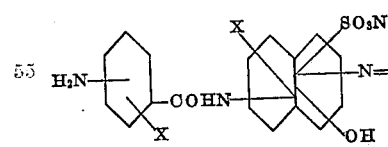

in which X is one or more of a group consisting of hydrogen, halogen, alkyl, alkoxy, alphyl, carboxy, and sulfonic acid, and in which the di-amino-diphenyl-urea is one of a group consisting of 3,3'- and 4,4'-diamino-diphenyl-urea.

2. A compound having the formula of claim 1 in which the amino group is one of the position consisting of meta or para to the COHN group, and amino-naphthol-sulfonic acid is 2-amino-5-naphthol-7-sulfonic acid.

3. A compound represented in the form of its sodium salt by the formula:

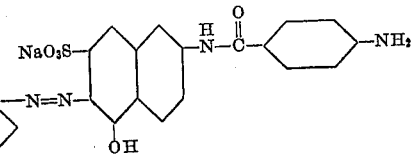

4. The process which comprises slurrying one of a group consisting of 3,3'- and 4,4'-diamino-diphenyl-urea with water, dissolving by the addition of 10-normal hydrochloric acid, cooling and diazotizing, adding thereto an alkaline solution of (4-amino-benzoyl)-2-amino-5-naphthol-7-sulfonic acid, sodium bicarbonate and sodium carbonate, agitating in alkaline media, heating the solution, and salting out.

5. The process which comprises diazotizing 3,3'-diamino-diphenyl-urea, coupling it to (4-amino-benzoyl)-2-amino-5-naphthol-7-sulfonic acid in alkaline solution, and adding salt.

6. The process which comprises diazotizing 3,3'-diamino-diphenyl-urea, coupling it to (4-amino-benzoyl)-2-amino-5-naphthol-7-sulfonic acid in alkaline solution, and isolating the product.

7. The compound represented by the formula:

in which → means diazotized and coupled to.

8. The compound represented by the formula:

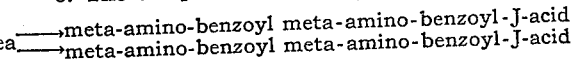

in which the arrows mean coupled by the azo reaction.

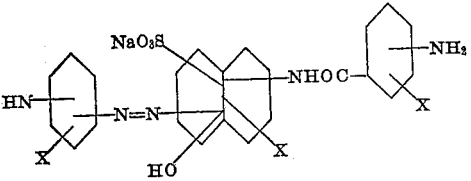

SWANIE S. ROSSANDER.